US009709792B2

United States Patent
Teetzel et al.

(10) Patent No.: US 9,709,792 B2
(45) Date of Patent: Jul. 18, 2017

(54) HELMET MOUNT WITH INTEGRAL BINOCULAR BRIDGE

(71) Applicant: Wilcox Industries Corp., Newington, NH (US)

(72) Inventors: James W. Teetzel, Portsmouth, NH (US); Travis S. Mitchell, Dover, NH (US); Nathaniel G. Wright, Rye, NH (US)

(73) Assignee: Wilcox Industries Corp., Newington, NH (US)

( * ) Notice: Subject to any disclaimer, the term of this patent is extended or adjusted under 35 U.S.C. 154(b) by 172 days.

(21) Appl. No.: 13/930,534

(22) Filed: Jun. 28, 2013

(65) Prior Publication Data

US 2015/0002930 A1  Jan. 1, 2015

(51) Int. Cl.
*G02B 23/18* (2006.01)
*G02B 27/01* (2006.01)

(52) U.S. Cl.
CPC ......... *G02B 23/18* (2013.01); *G02B 27/0149* (2013.01); *G02B 2027/0156* (2013.01)

(58) Field of Classification Search
CPC ........ G02B 7/002; G02B 23/00; G02B 23/12; G02B 23/18; G02B 23/16; G02B 23/125; G02B 25/002; G02B 27/1049; G02B 2027/0156; G02B 27/0149; A42B 1/066; A42B 3/04
USPC ..... 359/409, 410–413, 815, 817, 481; 2/6.1, 2/6.2, 422, 426; 361/807
See application file for complete search history.

(56) References Cited

U.S. PATENT DOCUMENTS

| 5,446,585 | A |   | 8/1995  | Morley et al. |
| 5,471,678 | A |   | 12/1995 | Dor |
| 5,703,354 | A | * | 12/1997 | Wannagot ............... G02B 23/12 250/214 VT |
| 5,786,932 | A |   | 7/1998  | Pniel |
| 6,462,867 | B2 |  | 10/2002 | Choinere |
| 6,462,894 | B1 |  | 10/2002 | Moody |
| 6,493,137 | B1 |  | 12/2002 | Solinsky et al. |
| 6,662,370 | B1 | * | 12/2003 | Buchanan, Jr. .................... 2/6.2 |
| 6,924,931 | B1 |  | 8/2005  | Lam et al. |

(Continued)

FOREIGN PATENT DOCUMENTS

| AU | 349602    | 7/2013 |
| GB | 2267764 A | 12/1993 |
| WO | 0223249 A1| 3/2002 |

OTHER PUBLICATIONS

Teetzel et al., Provisional U.S. Appl. No. 61/819,199, filed May 3, 2013.
ITL Optronics Ltd., "Mini N/SEAS Family" (Jan. 15, 2009).

*Primary Examiner* — Jie Lei
(74) *Attorney, Agent, or Firm* — McLane Middleton, Professional Association

(57) ABSTRACT

A helmet mount for attaching a viewing device to a helmet includes a helmet interface assembly removably attachable to the helmet. A pivot arm is attached to the helmet interface assembly and is pivotal about a horizontal, transverse axis. A carriage member is carried on the pivot arm and slidable between the distal end and the proximal end of the pivot arm. The carriage member includes a bridge member integral therewith, the bridge member including a first fastener configured to removably attach a first viewing device and a second fastener configured to attach a second viewing device.

17 Claims, 12 Drawing Sheets

(56) References Cited

U.S. PATENT DOCUMENTS

| | | | |
|---|---|---|---|
| 7,219,370 B1 * | 5/2007 | Teetzel et al. | 2/6.2 |
| 8,209,780 B1 | 7/2012 | Lemire | |
| 8,375,473 B2 | 2/2013 | Celona et al. | |
| 8,739,313 B2 | 6/2014 | Teetzel et al. | |
| 9,116,355 B2 | 8/2015 | Teetzel et al. | |
| 2004/0181856 A1 | 9/2004 | Oleson | |
| 2006/0007562 A1 | 1/2006 | Willey et al. | |
| 2007/0214551 A1 | 9/2007 | Teetzel et al. | |
| 2008/0170838 A1 | 7/2008 | Teetzel et al. | |
| 2011/0145981 A1 | 6/2011 | Teetzel et al. | |
| 2011/0239354 A1 | 10/2011 | Celona et al. | |
| 2012/0200917 A1 * | 8/2012 | Rivkin et al. | 359/481 |
| 2013/0083391 A1 | 4/2013 | Teetzel et al. | |
| 2014/0327962 A1 | 11/2014 | Teetzel et al. | |
| 2015/0323779 A1 | 11/2015 | Teetzel et al. | |

\* cited by examiner

HELMET MOUNT WITH INTEGRAL BINOCULAR BRIDGE

BACKGROUND

The present disclosure relates to an improved helmet mounting system for mounting a viewing device to headgear such as a tactical or military field helmet, and specifically, a mount with an integral binocular bridge attachment for same, which replaces the conventional dovetail shoe interface commonly found on existing helmet mounting systems. The integral bridge unit herein provides multiple options for monocular or binocular viewing devices and multiple flip options for moving an attached viewing device between a viewing position when the device is in use and a flipped or stowed position out of the user's line of sight when the viewing device is not in use. The integral bridge unit may be adapted to removably attach one or two viewing devices. The attached devices may be the same or different type of device and/or of the same viewing/imaging modality. The integral bridge herein may be adapted for use with any type of optical, opto-electronic, or electronic viewing device, including without limitation, night vision devices that enable viewing under nighttime or other low light conditions, such as a passive night vision goggle (NVG) device or enhanced night vision goggle (ENVG) device, thermal imaging device, short wave infra-red (SWIR) device, camera, head mounted display screen, and so forth. In a further aspect, the bridge system herein may include a plurality of side attachment members, each of which are adapted for a particular viewing device and which are removably and interchangeable attachable to the integral bridge member.

SUMMARY

A helmet mount for attaching a viewing device to a helmet includes a helmet interface assembly removably attachable to the helmet. A pivot arm is attached to the helmet interface assembly and is pivotal about a horizontal, transverse axis. A carriage member is carried on the pivot arm and slidable between the distal end and the proximal end of the pivot arm. The carriage member includes a bridge member integral therewith, the bridge member including a first fastener configured to removably attach a first viewing device and a second fastener configured to attach a second viewing device.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
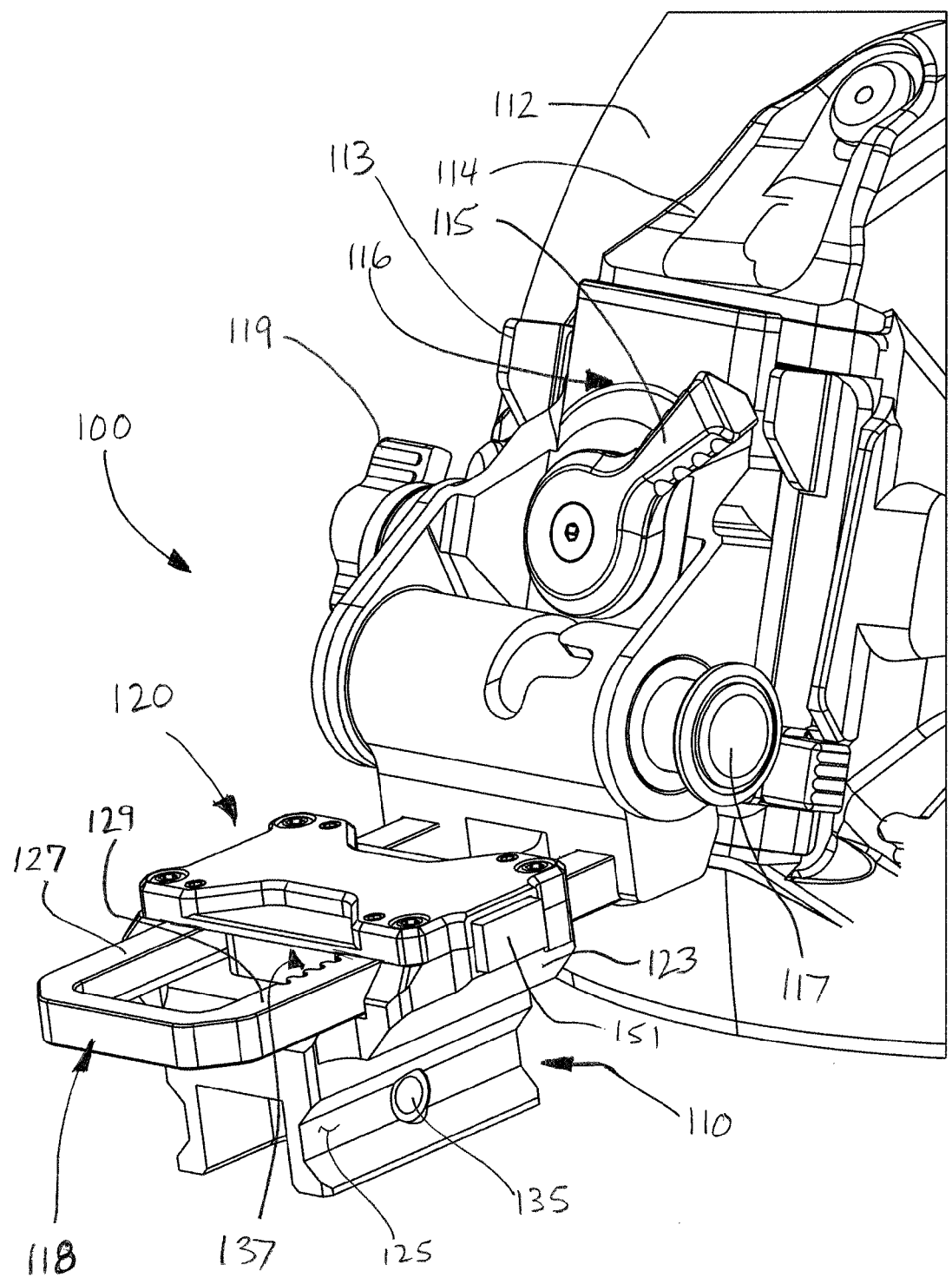
FIG. 1 is an isometric view of a helmet mount with integral binocular bridge according to a first exemplary embodiment.

Referring now to the drawings, wherein like reference numerals refer to like or analogous components throughout the several views, FIGS. 1-8 depict an exemplary helmet mount 100 having an integral binocular bridge 110. The helmet mount 100 is attached to a helmet 112 to position optical devices 230, which may be MINI N/SEAS night vision monoculars in FIGS. 4-7 before the left and right eyes of a user. It will be recognized that the present binocular bridge may be used with all manner of viewing devices, wherein the left and right devices may be the same or different. The helmet mounting system 100 may include as helmet interface assembly 116 for attachment to a mounting bracket 114 or other helmet interface, a vertical adjustment mechanism, tilt axis adjustment mechanism, and breakaway/nonbreakaway features, and so forth, as described in commonly owned U.S. Pat. No. 7,219,370 or U.S. Patent Application Publication No. 2013/0083391, each of which is incorporated herein by reference in its entirety. The sliding carriage with integral binocular bridge is shown and described herein with a preferred pivoting helmet mount 100. It will be recognized that the present development can be adapted for use with other helmet mounts including without limitation alternative helmet mounts available from Wilcox Industries Corp. of Newington, N.H.

The helmet mount 100 attached to a bracket 114 attached to the front portion of the helmet 112. A first pivoting segment 116 is removably attached to the bracket 114 and may include a vertical adjustment mechanism 115 for positioning the devices 230 at a desired height, a breakaway mechanism 113 e.g., in which the segment 116 (or a portion thereof) will release upon application of a predetermined force, a tilt adjustment mechanism 119 for adjusting the angle of the optical axis of the viewing devices 230, and so forth.

In the illustrated embodiment, the helmet mount 100 includes an upper locking tab 111 and a lower locking tab 121, which engage complimentary grooves (not shown) on the bracket 114. The helmet mount 100 may also include a breakaway selector 113 which can be moved between breakaway and nonbreakaway positions. A slider bar 156 is mechanically linked to the lower tab 121 and slidable to allow the user to selectively attach and remove the helmet mount 100 to and from the bracket 114. When the selector 113 is moved to the breakaway position, the lower tab 121 is movable (e.g., against a biasing spring) wherein the beveled edge enables the lower tab to move upward and disengage from the groove upon the application of a sufficient force. When the selector 113 is in the nonbreakaway position, the tab 121 is rigidly retained within the corresponding groove. The breakaway setting is advantageous in that it may prevent injury to the wearer, e.g., in the event of entanglement or impact of the optical device.

Figure 2:
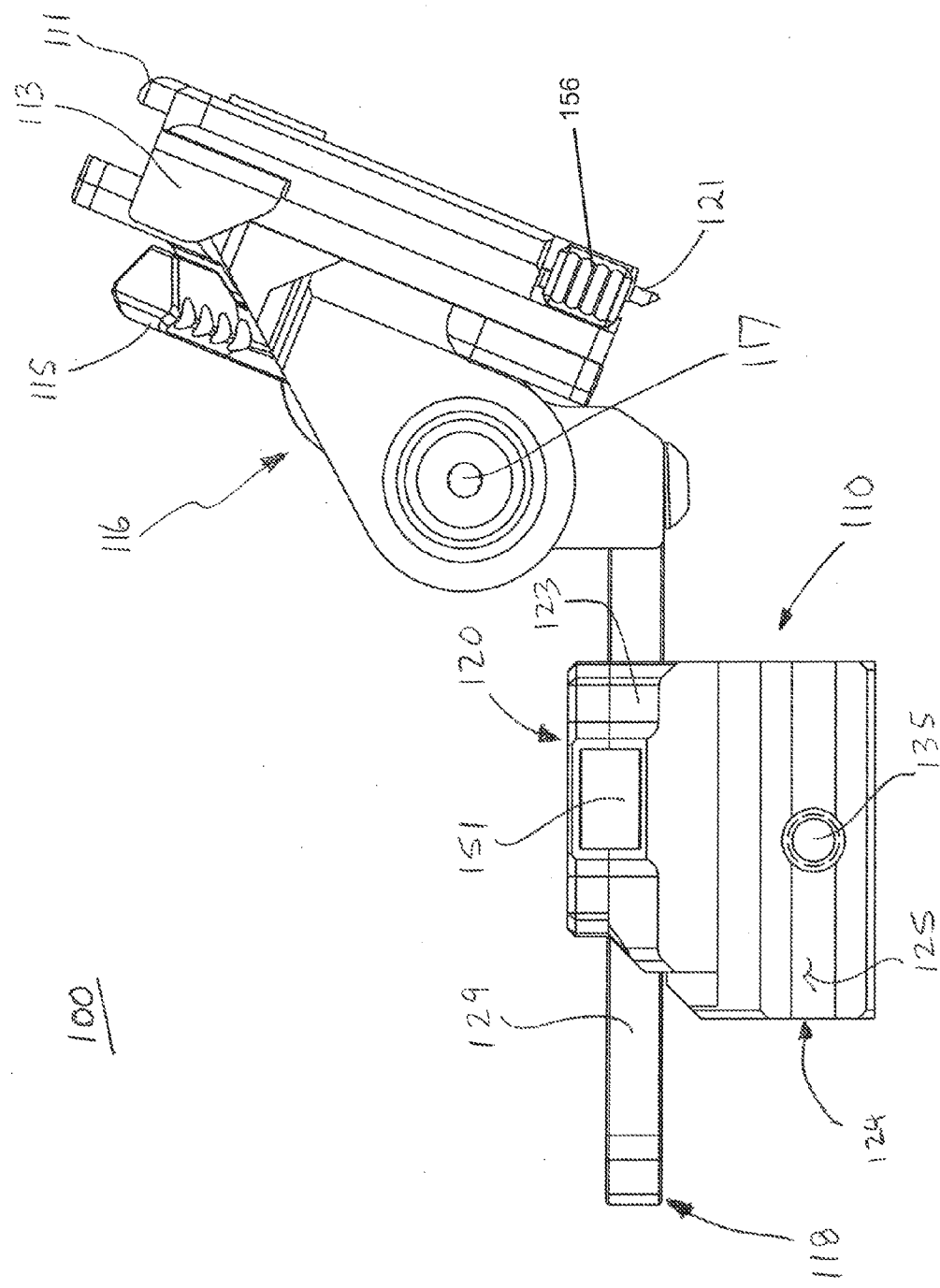
FIG. 2 is a side view of the helmet mount appearing in FIG. 1, with the carriage arm in the deployed position.
Figure 3:
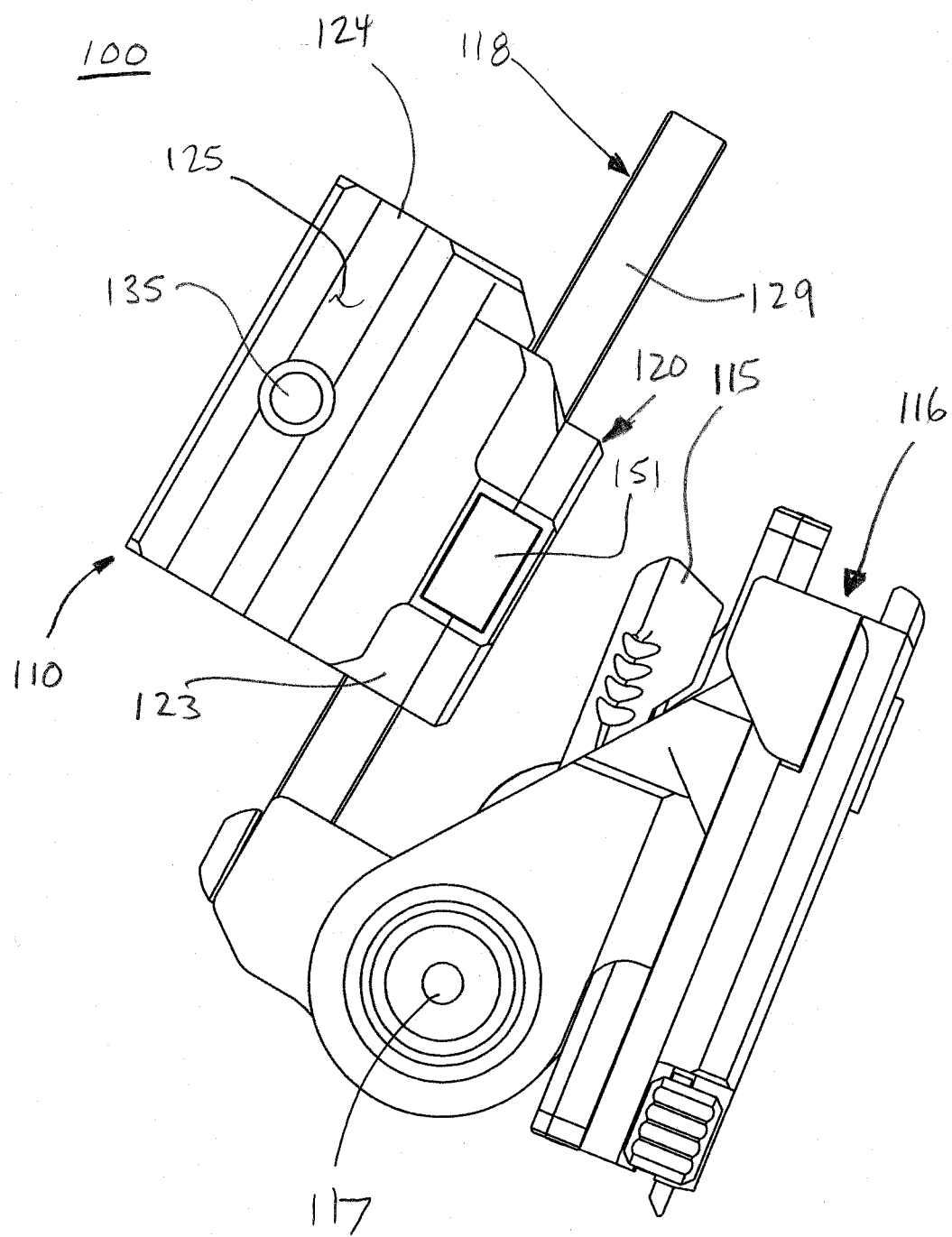
FIG. 3 is a side view of the helmet mount appearing in FIG. 1, with the carriage arm moved to the stowed position.
Figure 5:
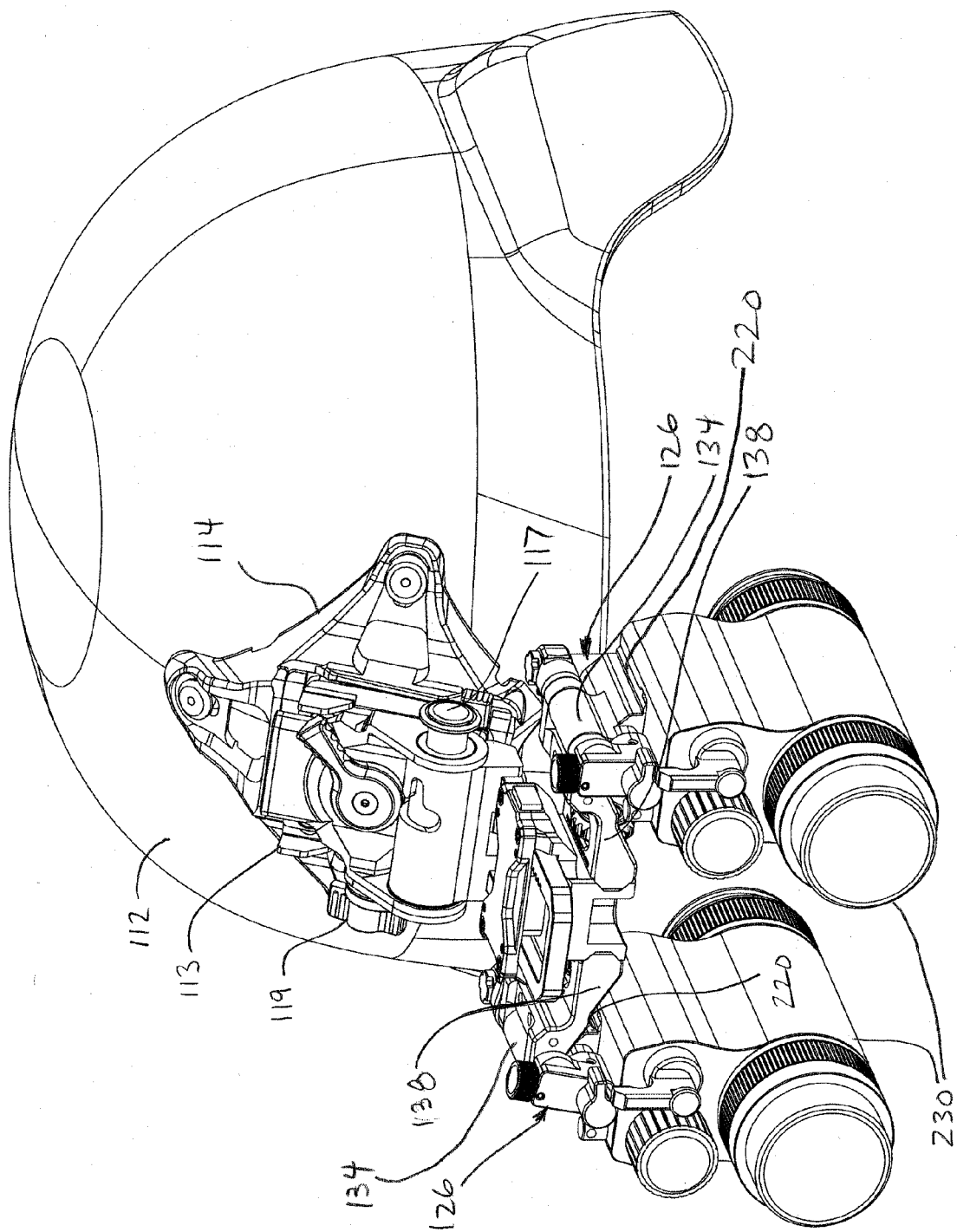
FIG. 5 is an isometric view of the helmet mount appearing in FIG. 1 with left and right viewing devices attached and in the deployed position.
Figure 7:
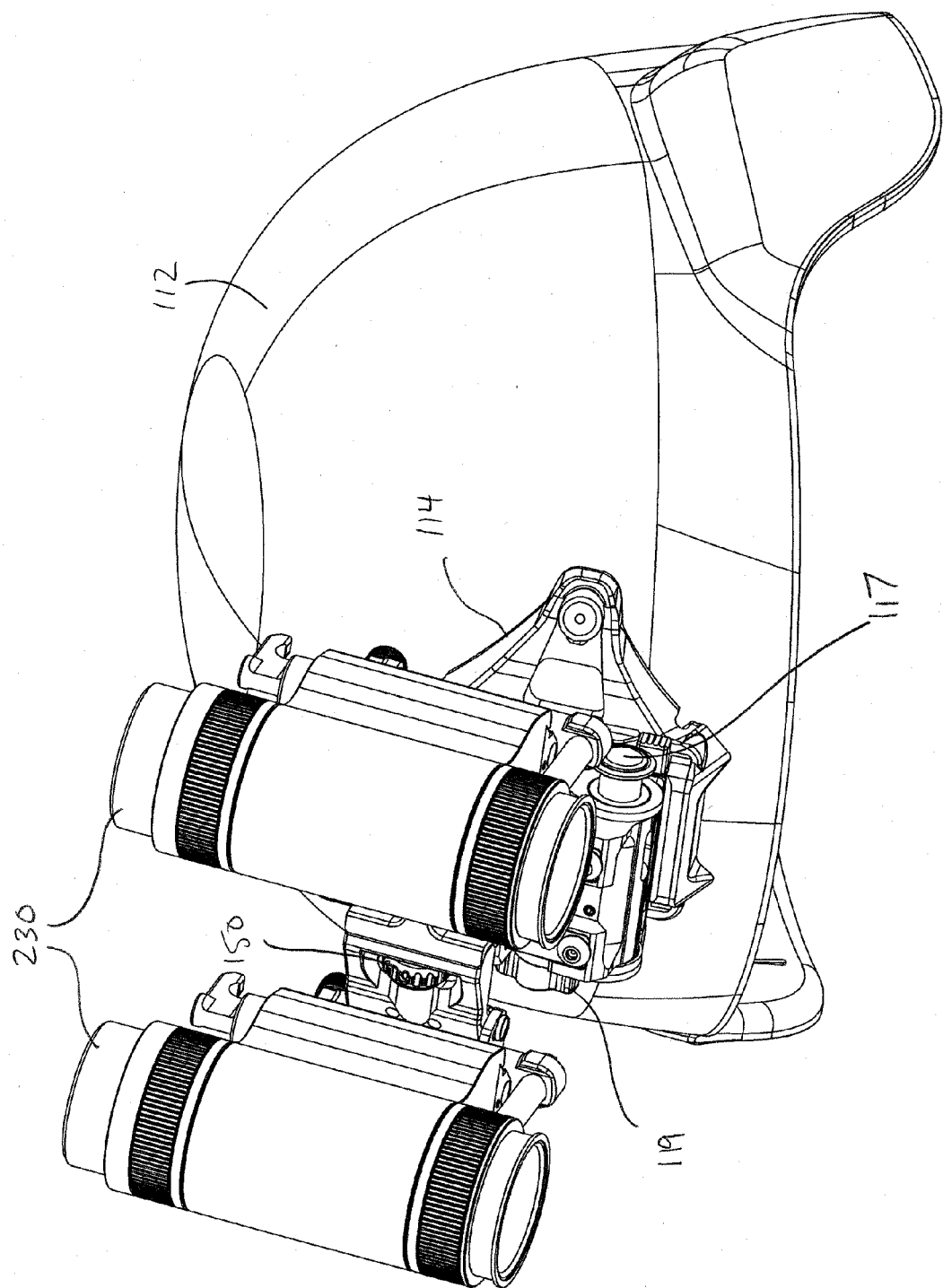
FIG. 7 is an isometric view of the helmet mount appearing in FIG. 1 with left and right viewing devices attached and in a first stowed position.
Figure 8:
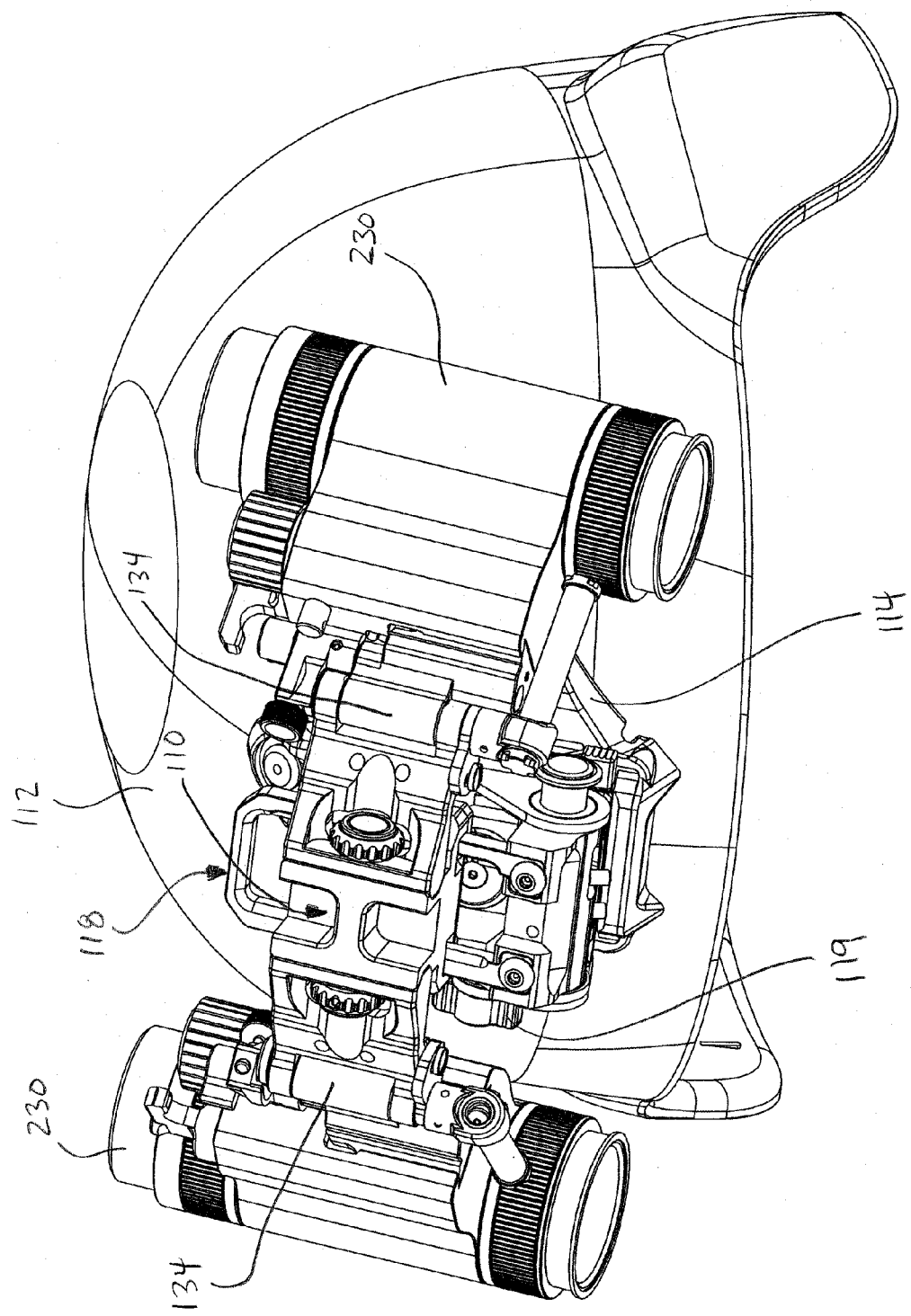
FIG. 8 is an isometric view of the helmet mount appearing in FIG. 1 with left and right viewing devices attached and in a second stowed position.

A second pivoting segment 118 is pivotally attached to the first pivoting segment 116 about a pivot axis or cylinder 117. The second segment 118 extends horizontally when in the deployed position (see, e.g., FIGS. 1 and 2). The second segment 118 includes carriage rails 127 and 129 and a sliding carriage member 120 with integral binocular bridge 110. The sliding carriage member 120 is slidable on the rails 127, 129 which provides a fore-and-aft adjustment mechanism for positioning the devices 230 at a desired distance or focal position in front of the user's eyes. Pivoting movement of the second segment 118 relative to the first segment 116 allows a wearer to selectively move the viewing devices between the deployed position as shown in FIGS. 1, 2 and 5, to a first stowed position wherein the viewing devices are pivoted up and out of the user's line of sight, as shown in FIG. 7. In preferred embodiments, further pivoting movement on the vision device interface as described below allows the vision devices 230 to be pivoted to a second stowed position, as shown in FIG. 8, wherein the devices 230 are moved back and over the helmet, thereby reducing torque and strain on the user's neck.

Figure 4:
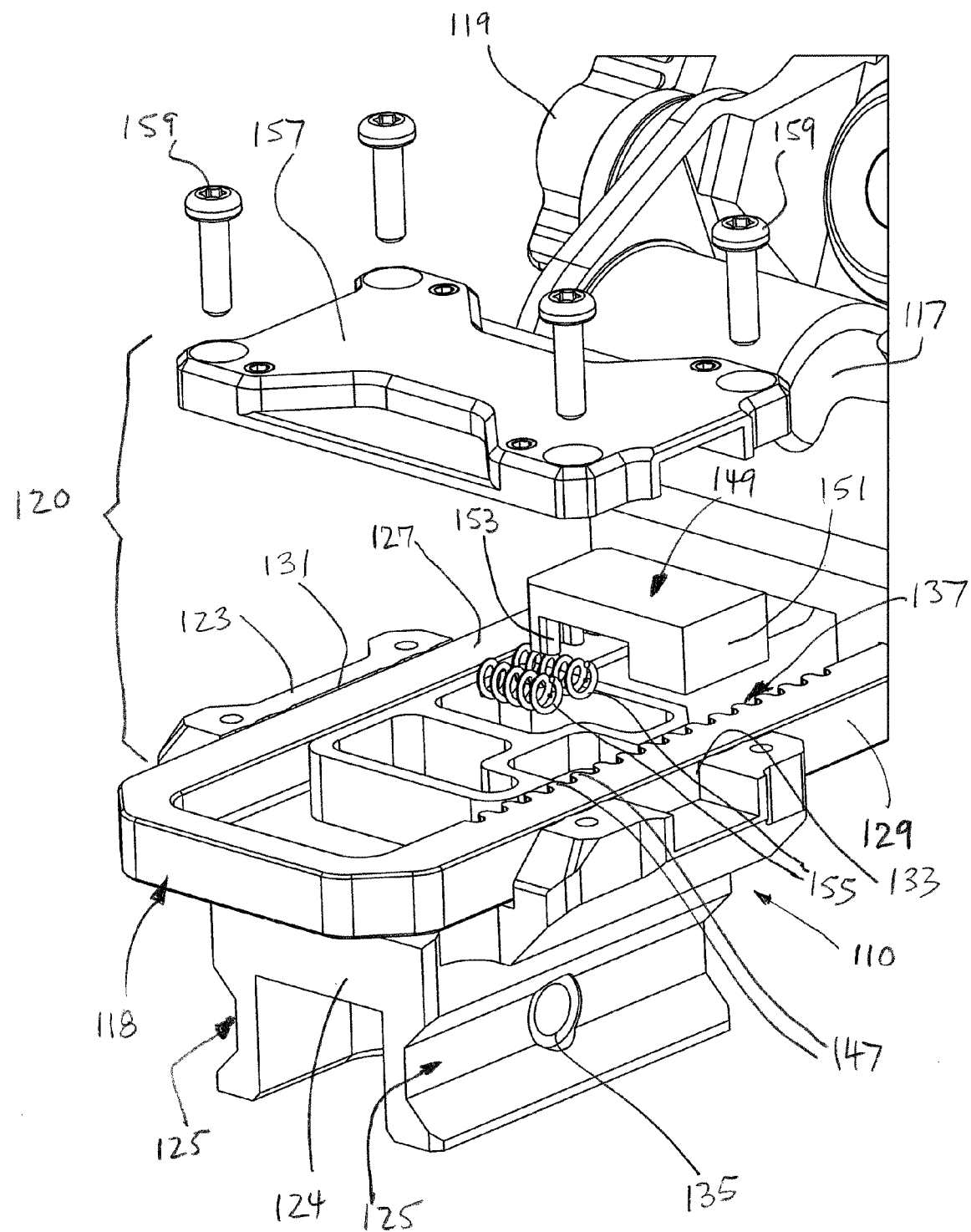
FIG. 4 is an exploded view of the integral sliding carriage/binocular bridge member.

As best seen in FIG. 4, the bridge unit 110 comprises a slide portion 123 which slidably engages the rail members 127, 129. A center section 124 attached to or integral with the slide 123 includes a left and right grooves or channels 125 which are shaped or keyed to provide a stable contacting surface for providing stability and preventing wobbling of an attached viewing device 230. The center section 124 includes an opening 135 on each side for receiving a threaded fastener 154 for securing the viewing devices 230.

The pivoting assembly 118 includes the first and second parallel arms 127, 129. The first arm 127 is received within a channel 131 formed in the slide portion 123. The second arm 129 is received within channel 133 in the slide 123 and includes a gear rack portion 137 having a plurality of spaced apart teeth 147 on an inward facing edge thereof.

A slide lock member 149 includes an actuator portion 151 disposed so as to be manually actuatable by the user and locking teeth 153 engaging the gear rack 137. One or more captured springs 155 bear against the actuator portion 151, urging the locking teeth 153 into engagement with the gear rack 137 to secure the bridge unit 110 at a desired position on the rail 118. The springs 155 may be coil springs or other type of spring or resilient member.

In operation, to adjust the fore and aft position of the bridge member 110, the actuator portion 151 is manually depressed by the user, against the bias of the springs 155, to move the locking teeth 153 out of engagement with the gear rack 137 to allow the slide 123 to be moved to a desired position along the rail 118. A cover plate 157 is secured to the slide portion 123 via fasteners 159, such as threaded fasteners.

Left and right side sections 126 are removably attachable to the center section 124 on opposite transverse sides and are generally arranged as mirror images of each other. The left and right side sections 126 are also removably attachable to the viewing devices 230 to provide an interface between the viewing device and the bridge member 110. The sections 126 are secured to the center section via the threaded member 154 which rotatably engages the corresponding left or right opening 135 in the center section 124. The threaded member 154 includes an enlarged diameter wheel 150 which is received within an opening 152 in the side section 126 to allow the user to manually rotate the threaded member 154. Rotating the wheel 150 allows the side section 126 to selectively be removed from and secured to the center section 124 via fastener 135.

Each side section 126 includes a hinged mounting arm 138 hingedly attached to a viewing device mount 220 about a pivot or hinge 134. The mounts 220 are configured to removably attach to a mounting shoe on the viewing device, such as a dovetail mounting shoe as are known in the art.

Figure 11:
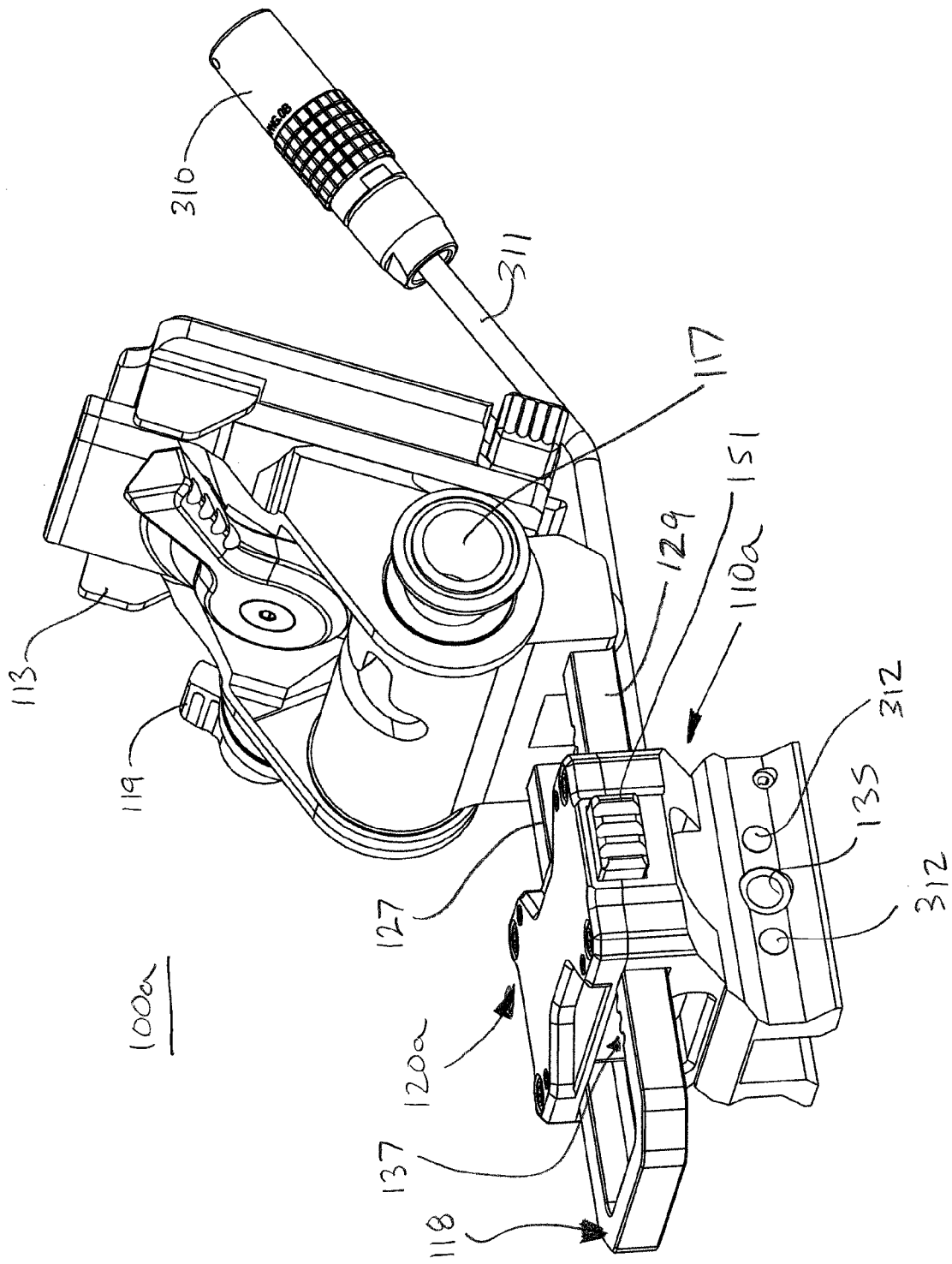
FIG. 11 is an isometric view of a helmet mount with integral binocular bridge according to a second exemplary embodiment.
Figure 12:
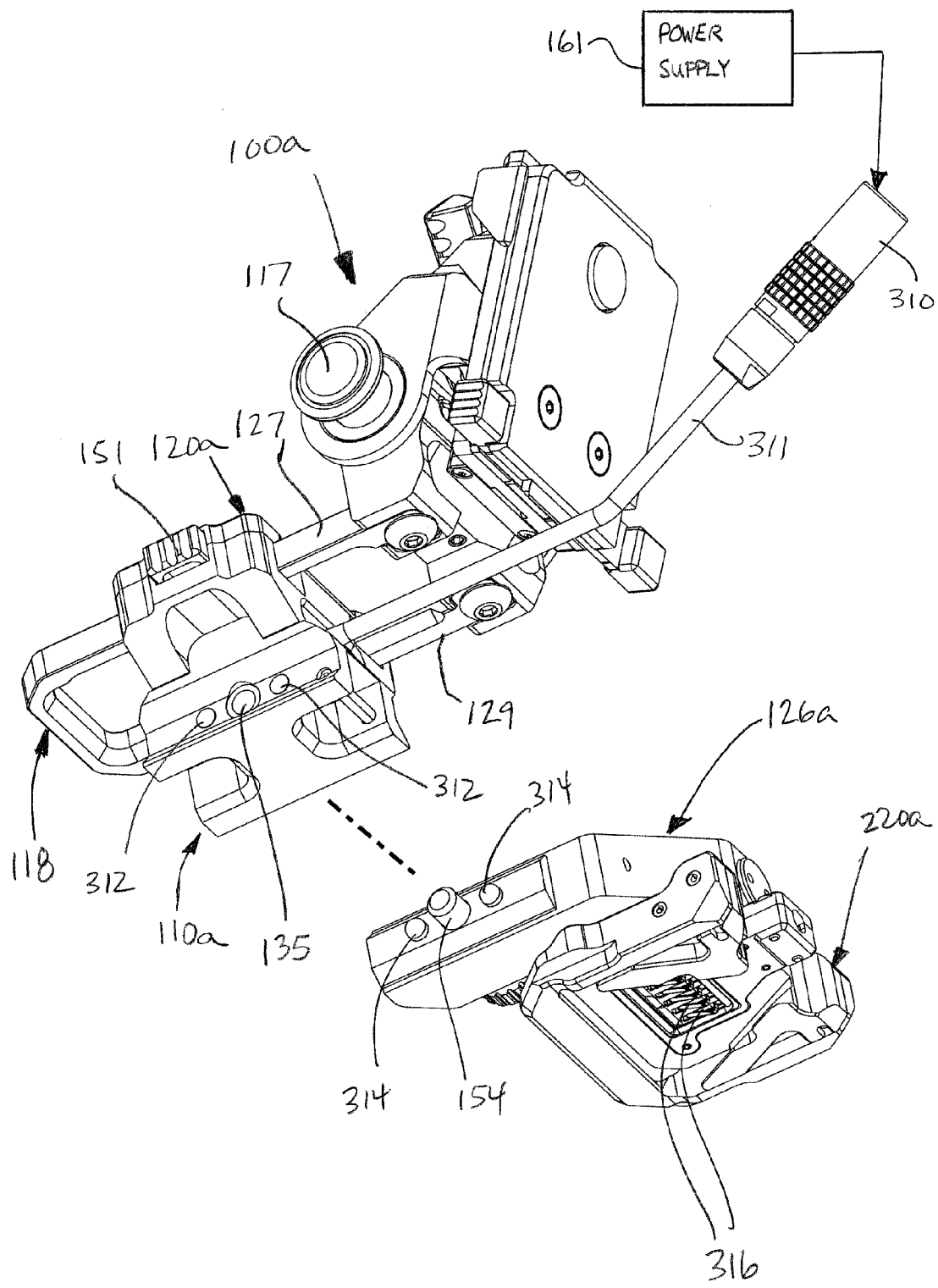
FIG. 12 is a partially exploded view taken generally from the bottom of the helmet mount appearing in FIG. 11 and a right side mounting member.

Referring now to FIGS. 11 and 12, there appears an alternative embodiment helmet mounting system 100a operable to provide electrical power from an external power supply 161 to an electrically operated viewing device (e.g., 230) to provide greater operation time and ready replacement of the power supply. The system 100a includes an electrical connector 310 which may removably connect with a mating connector (not shown) electrically coupled to the power supply 161. For example, the connector 310 may connect to a mating connector on the helmet 112, which may be coupled to a remote power supply, such as a power supply attached to another location on the helmet 112 or otherwise worn or carried by the user.

The connector 310 is attached to a cable 311 with electrical conductors, which are electrically coupled to electrical contacts 312 in a binocular bridge member 110a integral with a sliding carriage 120a. The contacts 312 engage contacts 314 in an attached side member 126a. The contacts 314 may be spring biased to bear against the contacts 312. The contacts 314, in turn, are electrically coupled to electrical contacts 316 in the device mount portion 220a of the side member 126a. The contacts 316 engage aligned electrical contacts (not shown) on the viewing device mounting shoe to power the viewing device.

Referring again to FIGS. 1-8, in the illustrated embodiment, the side sections 126 may be as shown and described in the above-incorporated U.S. Patent Application Publication No. 2013/0083391 and may have the lateral adjustment and pivoting features as described therein. In 2013/0083391, lateral spacing, e.g., for pupillary alignment is accomplished by rotation, and is advantageous for optical viewing devices or night vision devices employing photomultiplier tubes.

Figure 9:
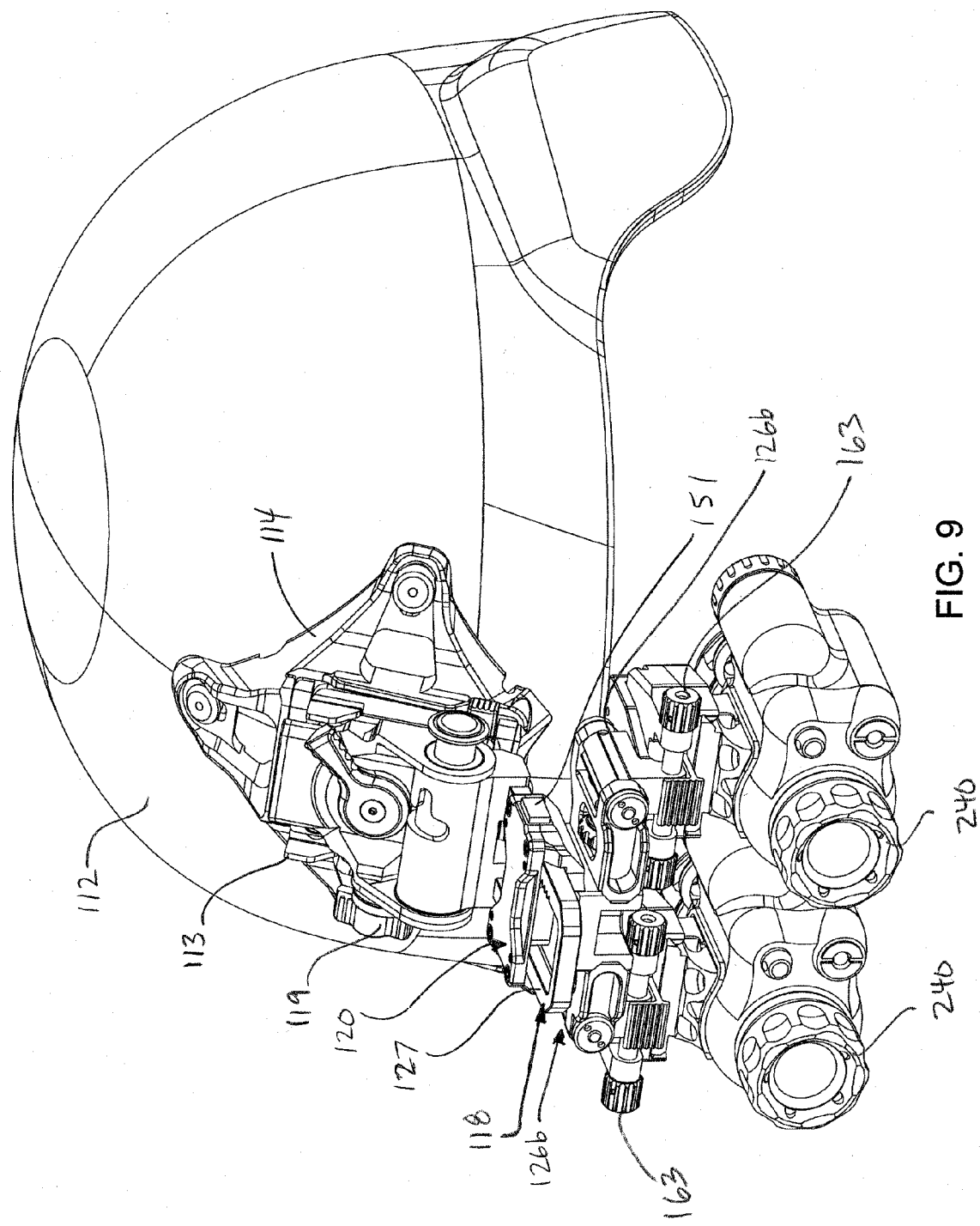
FIG. 9 is an isometric view of the helmet mount appearing in FIG. 1 with a pair of OASYS Technology SkeetIR thermal imaging monoculars attached.

Referring to FIG. 9, in alternative embodiments, the side sections (see, e.g., side sections 126b in FIG. 9) may be as described in commonly owned U.S. Provisional Patent Application No. 61/819,199 filed May 3, 2013, the entire contents of which are incorporated herein by reference. The bridge side attachment sections in the aforementioned application No. 61/819,199 includes linear pupillary/transverse adjustment (see, e.g., side sections 163 in FIG. 9) and are therefore particularly advantageous for use in connection with viewing devices such as a thermal imaging device 240 or other viewing device employing a display screen.

Referring again to FIGS. 1-8, outward pivoting of each of the left and right side sections 126 about the pivot hinge 134 allows each of the attached viewing devices 230 to be moved to a non-viewing position when not in use (see FIG. 8). One or both of the devices 230 can be pivoted independently of the other. This allows the user to move one or both of the viewing devices 230 up and out of the user's line of sight without the need to pivot the second segment 118 of the helmet mount 100 to the stowed position. If the user intends to stow the viewing devices for a longer period, the second segment 118 can be additionally pivoted to the stowed position to move the device further back toward the user's center of mass in order to reduce neck strain and fatigue, as shown in FIG. 8.

Unlike some of the prior art helmet mounts, which are adapted for use with a particular model viewing device, the present development provides a universal bridge as an integral component, which allows the helmet mount 100 to function as a universal helmet mount, which can be adapted for binocular viewing with all manner of monocular viewing devices. In certain embodiments, the present development is directed to a modular system, wherein a plurality of side sections may be interchanged to provide a desired binocular system.

Figure 6:
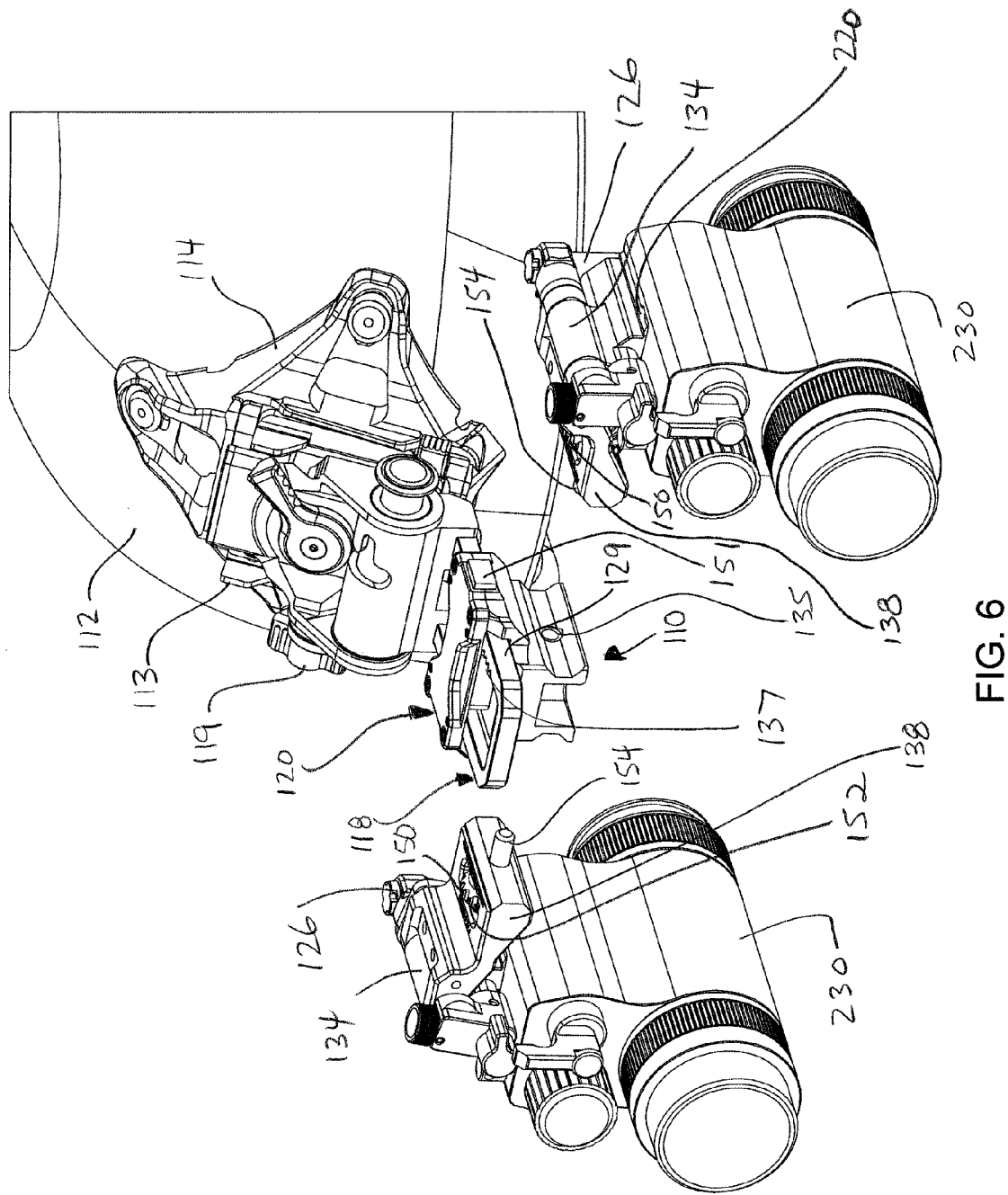
FIG. 6 is a partially exploded view of the helmet mounting system appearing in FIG. 1 with the left and right viewing devices detached.

For example, FIGS. 6-8 illustrate a binocular system employing two MINI N/SEAS night vision monoculars. Systems employing other passive or enhanced night vision devices are also contemplated.

FIG. 9 shows an alternative system wherein device interface members 126b are adapted for use with thermal camera systems 240, such as the OASYS Technology SkeetIR thermal imaging monoculars. The interface members 126b may be as described in the above-incorporated Application No. 61/819,199.

Figure 10:
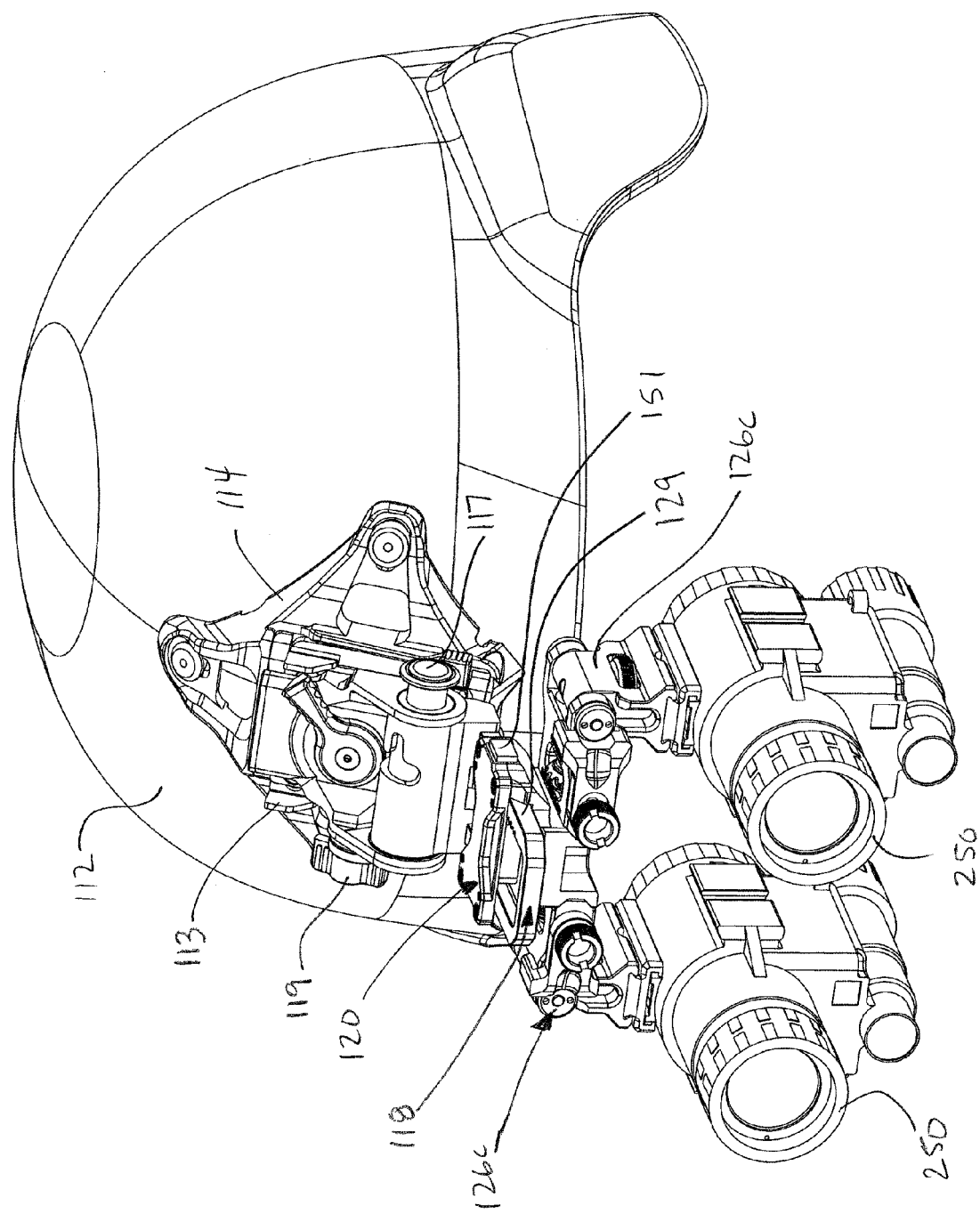
FIG. 10 is an isometric view of the helmet mount appearing in FIG. 1 with a pair of MUM-14B passive night vision monoculars.

FIG. 10 shows yet another alternative embodiment wherein device interface members 126c are adapted for use with MUM 14-B night vision monoculars 250. Other viewing systems include the AN/PVS-14 night vision system, visible wavelength imaging systems, and others.

Although the illustrated embodiments illustrate binocular systems wherein the same type of viewing device is provided for each eye, it will be recognized that the left and right side viewing devices may be attached independently such that each eye may view devices of different types and/or imaging modalities.

The invention has been described with reference to the preferred embodiments. Modifications and alterations will occur to others upon a reading and understanding of the preceding detailed description. It is intended that the invention be construed as including all such modifications and alterations.

What is claimed is:

1. A helmet mount for attaching a viewing device to a helmet, the mount comprising:
   a helmet interface assembly removably attachable to the helmet;
   a pivot arm attached to the helmet interface assembly and pivotal about a horizontal, transverse axis, the pivot arm having a proximal end and a distal end;
   a carriage member carried on the pivot arm and slidable along the pivot arm between the distal end and the proximal end of the pivot arm, the carriage member having an upper extent lying in an upper plane extending parallel to said pivot arm;
   the carriage member including a bridge member integral therewith, the bridge member disposed beneath the upper plane, the bridge member including opposed first and second side surfaces, the first and seconds side surfaces being on opposite transverse sides of the pivot arm;
   a first side section including a first mounting arm hingedly attached to a first viewing device mount;
   a second side section including a second mounting arm hingedly attached to a second viewing device mount;
   the first side surface including a first plurality of electrical contacts configured to be mated with corresponding contacts on the first mounting arm;
   the second side surface including a second plurality of electrical contacts configured to be mated with corresponding contacts on the second mounting arm;
   the first mounting arm including a first fastener element extending from a first mating surface and the second mounting arm including a second fastener element extending from a second mating surface;
   the first side surface having a first opening removably receiving the first fastener element, the first fastener element and the first opening being positioned to guide mating of the first plurality of electrical contacts with the corresponding contacts on the first mounting arm; and
   the second side surface having a second opening removably receiving the second fastener element, the second fastener element and the second opening being positioned to guide mating of the second plurality of electrical contacts with the corresponding contacts on the second mounting arm.

2. The helmet mount of claim 1, further comprising:
   the first viewing device mount including a first mounting shoe receptacle configured to removably attach to a mounting shoe of a first viewing device; and
   the second viewing device mount including a second mounting shoe receptacle configured to removably attach to a mounting shoe of a second viewing device.

3. The helmet mount of claim 2, further comprising:
   the first side section including a first hinge that allows rotation of a first attached viewing device between a viewing position before a first eye of a user and a first non-viewing position out of a line of sight of the user; and
   the second side section including a second hinge that allows rotation of a second attached viewing device between a second viewing position before a second eye of a user and a second non-viewing position out of the line of sight of the user.

4. The helmet mount of claim 3, wherein the first and second hinges each pivot about a pivot axis that is parallel to optical axes of the first and second attached viewing devices.

5. The helmet mount of claim 2, further comprising:
   an electrical circuit for electrically coupling a power supply to one or both of a first attached viewing device and a second attached viewing device.

6. The helmet mount of claim 2, wherein the first and second mounting shoe receptacles are linearly movable with respect to the first and second side sections, respectively, along a horizontal axis orthogonal to optical axes of the first and second viewing devices when the first and second side sections are in a deployed position.

7. The helmet mount of claim 1, wherein the helmet interface assembly includes one or both of:
   a vertical adjustment assembly for positioning an attached viewing device at a desired vertical position; and
   a tilt adjustment assembly for adjusting a viewing angle of an attached viewing device.

8. The helmet mount of claim 1, wherein the pivot arm pivots between a lower position and an upper position for use and stowage, respectively, of a viewing device attached to the bridge member.

9. The helmet mount of claim 1, wherein the carriage member is slidable along the pivot arm to a desired position between the proximal end and the distal end of the pivot arm.

10. The helmet mount of claim 1, wherein the helmet interface assembly includes a breakaway connector which causes at least a portion of the helmet mount to detach from the helmet upon the application of a predetermined force.

11. The helmet mount of claim 1, further comprising:
a gear rack on said pivot arm;
a slide lock carried on said carriage member, the slide lock having locking teeth which intermesh with the gear rack to secure the carriage member at a desired position on the pivot arm, the slide lock being manually actuatable to selectively move the locking teeth out of engagement to provide fore-and-aft adjustment of the carriage member.

12. The helmet mount of claim 1, further comprising a captured spring within said carriage member urging the locking teeth into engagement with the gear rack.

13. The helmet mount of claim 1, further comprising a viewing device.

14. The helmet mount of claim 13, wherein the viewing device comprises a pair of monocular viewing devices.

15. The helmet mount of claim 1, wherein each of the the first and second side sections is adapted for mounting one or more viewing devices selected from the group consisting of an optical device, opto-electronic device, sighting device, targeting device, passive night vision device, enhanced night vision device, thermal imaging device, infrared imaging device, short-wave infrared imaging device, helmet mounted display screen, and combinations thereof.

16. The helmet mount of claim 1, wherein the first side surface is keyed to mate with the first mating surface and the second side surface is keyed to mate with the second mating surface.

17. The helmet mount of claim 1, further comprising:
at least one device interface member configured to attach to a different type of viewing device, wherein each of the at least one device interface member is attachable to the bridge member and interchangeable with one or both of the first and second side sections.

* * * * *